July 11, 1950

R. T. CALL 2,514,470

AIRCRAFT SKI

Filed Sept. 26, 1947

Inventor

Revel T. Call

By Clarence A. O'Brien
and Harvey B. Jacobson
Attorneys

July 11, 1950     R. T. CALL     2,514,470
AIRCRAFT SKI
Filed Sept. 26, 1947     2 Sheets-Sheet 2
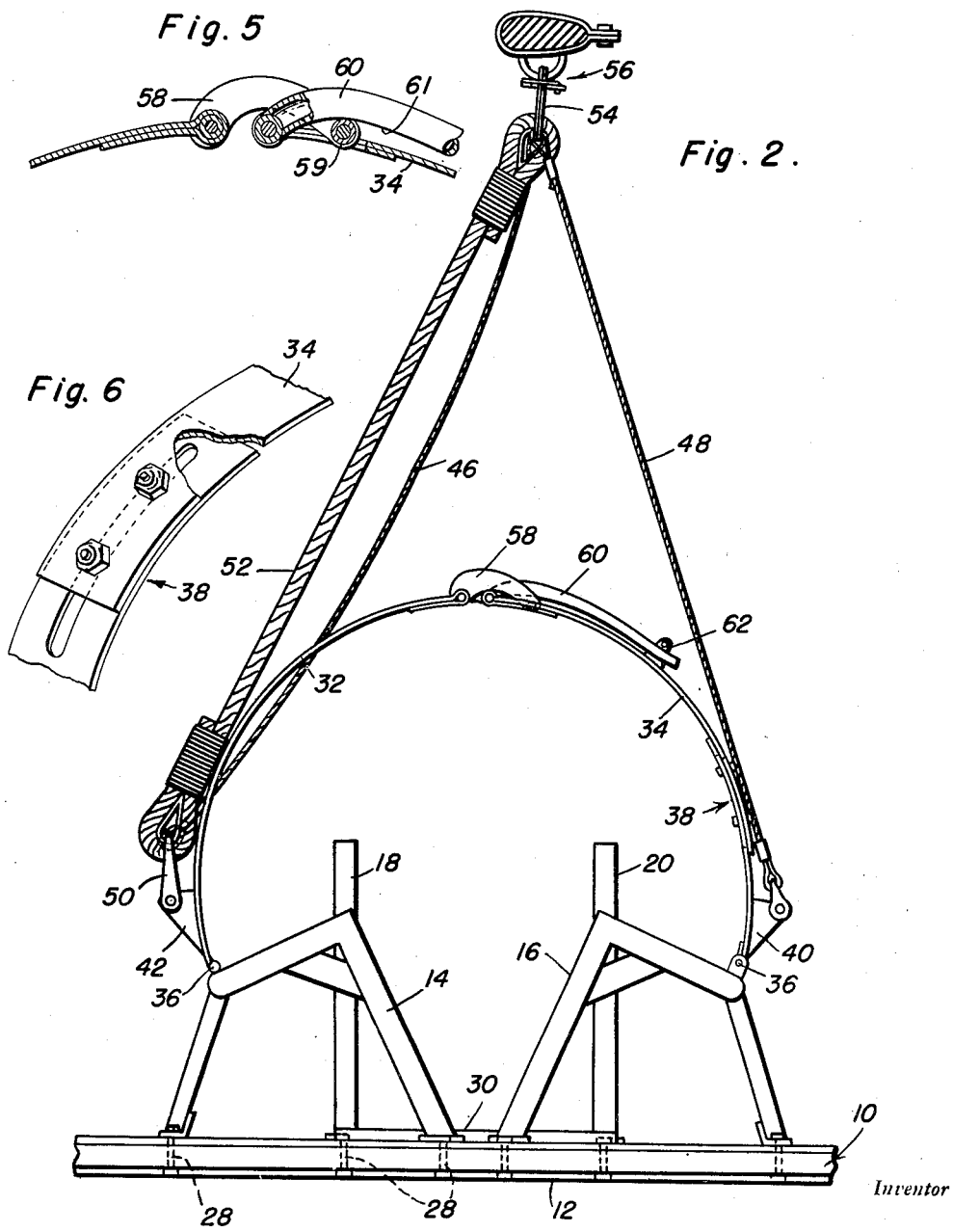
Inventor
Reuel T. Call
By Clarence A. O'Brien
and Harvey B. Jacobson
Attorneys Patented July 11, 1950

2,514,470

UNITED STATES PATENT OFFICE 2,514,470

AIRCRAFT SKI

Reuel T. Call, Afton, Wyo.

Application September 26, 1947, Serial No. 776,191

6 Claims. (Cl. 280—13)

This invention appertains to novel and useful improvements in aircraft attachments and pertains particularly to aircraft skis.

A general purpose of this invention is to provide an extremely efficient, satisfactorily operative means of landing light aircraft ordinarily provided with wheels in snow safely and efficaciously.

Another purpose of this invention is to provide an improved runner having frame members thereon and means for attaching, locking and grasping aircraft wheels between said frame members.

A still further object of this invention is to provide adjustable resilient straps for engaging the aircraft wheels in a locking position.

Another purpose of this invention is to provide means for adjusting the efficacy of said wheel locking and engaging means.

Yet another object of this invention is to provide means for centering and locking an aircraft wheel between said frame members, relative to lateral movement.

Other objects and features of novelty will become apparent to those skilled in the art, in following the description of the preferred form of the invention, illustrated in the accompanying drawings, wherein:

Figure 2 is an enlarged elevational side view of the invention;

Figure 5 is a fragmentary view of the latching device to hold the tire-engaging member in place on an aircraft tire;

Figure 6 is a perspective view of a part of one of the straps showing one form of adjusting means employed therein.

Figure 1:
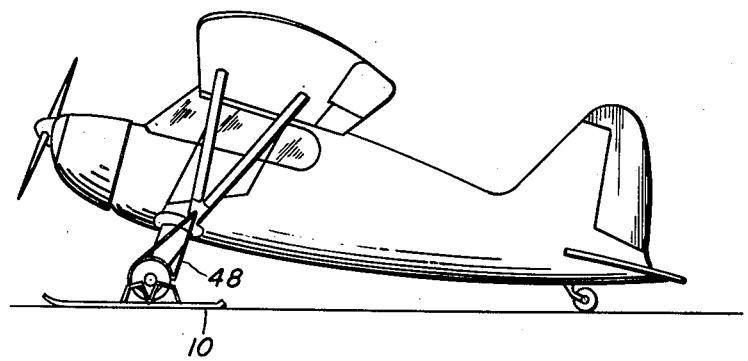
Figure 1 is a pictorial view of an aircraft showing the invention fixed thereon.
Figure 3:
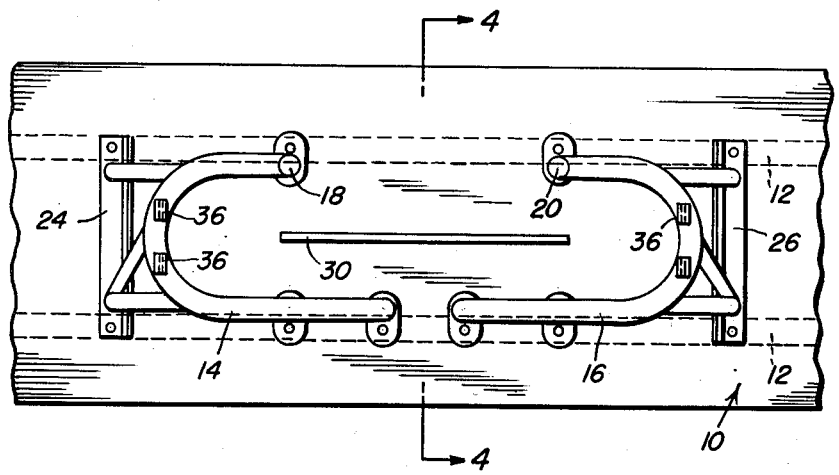
Figure 3 is a plan view of a portion of the invention.
Figure 4:
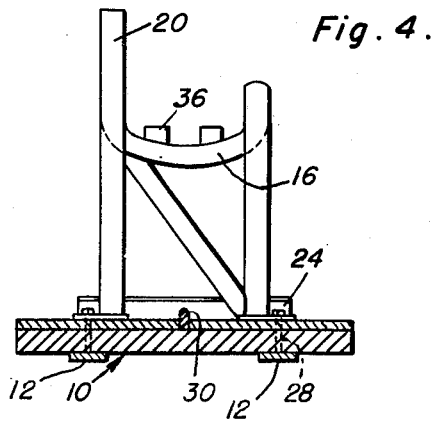
Figure 4 is a transverse sectional view of the invention shown in Figure 3 and taken substantially on the line 4—4 thereof and in the direction of the arrows.

This invention has been developed to provide a device which is simple in structure and which provides an efficacious means for landing aircraft in snow and the like. The invention is particularly well adapted to light aircraft.

Runners 10, preferably of laminated wood, plastic or other suitable material, are provided with skags 12 extending longitudinally thereof. The said runners have upturned front portions and slightly upturned rear portions for obvious reasons.

Frame members, generally indicated at 14 and 16 are attached to the said runners and are of such a configuration as to form a cradle for receiving an aircraft wheel therein. Strips 18 and 20 forming a part of said frame members extend therefrom for the purpose of engaging the inner portion of an aircraft wheel. The said frame members are preferably attached to the said runners through the medium of cross members 24 and 26 respectively and countersunk screws or the like 28 extending through the said skags 12. It will be noted at this point that the construction of the said frame members is such as to be extremely light in weight, this being a material feature in aerodynamic consideration.

Extending longitudinally of the said runners 10 is means for centering and locking an aircraft wheel within the said frame members 14 and 16. This means is preferably a protuberance 30 extending from the upper surface of the said runners and if desired, may be a strip sunk and fastened within the said runner. The usual aircraft tire is generally soft enough to allow the protuberance to bury itself therein.

It will be noted at this point that the said runner member has wear resistant means on the under surface of the said runner member and this wear resistant means may include expedients such as a coating with wax or any other known ski preparation.

Straps 32 and 34 are provided and means for pivotally securing the said straps to the frame members is also associated therewith. This means may be conventional hinge members 36 on the said frame members and also on the terminal portions of the said straps, having a pin extending therethrough. The said straps 32 and 34 are resilient in nature and are adapted to grasp the outer periphery of the aircraft wheel very tightly. Adjusting means for lengthening and shortening the efficacious length of the said strap 34 is provided. This adjusting means may be a simple slot and friction securing means construction. This adjusting means is generally indicated at 38 (see Figure 2 and Figure 6). The strap 34 is formed of two parts, overlapped and the aforementioned openings provided therein receive the bolts and nuts disclosed in Figure 6. Means for attaching the resilient straps to an aircraft truss or any other suitable element is provided. This means consists preferably of a pair of brackets 42 and 40 respectively associated with each of the said straps having cable means 46 and 48 pivoted to each of the said brackets 40 and 42. The said cable means 46 may be connected to the said bracket 42 through the medium of an eye member 50 which is in turn pivoted to the said cable means 46 and the said bracket 42. A similar fastening assembly is provided for the cable 48.

A resilient and/or flexible shock cord 52 is secured to the said bracket 42 (through the medium of the said eye member) and to a second eye member 54 which is in turn associated with an appropriate aircraft element. Of course, the shock cord 52 is at the leading edge of the said runner in order to perform its intended function. A clip 56 may be associated with the said eye member 54 for easy attachment and detachment thereof.

A latch keeper 58 is pivoted to the said strap 32. A cam type latch 60 is pivoted to the other strap 34 for completing the latch keeper. This is accomplished by sliding the end of the keeper 60 beneath the pin 59 of the keeper 58 and then pivoting the keeper so that the pin 59 slides downwardly on the cam surface 61. A clip 62 is provided on the said strap 34 for the purpose of retaining the said latch 60 in a locked position.

It will be noted at this point that the said shock cord 52 may be formed with eye members at the terminal portions thereof by folding back the end upon the length of the said cord 52 and wrapping a small cord therearound. Of course, the said small cord may be coated with resin, shellac or any other suitable material. This is but a matter of choice and entirely within the prerogative of the manufacturer.

Having described the invention, what is claimed as new in:

1. In an aircraft ski, a runner, frame members attached to said runner adapted to engage and retain an aircraft wheel, resilient straps, means for pivotally securing said straps to said frame members, means for attaching said straps to an aircraft strut, said attaching means including brackets secured to said straps adjacent said pivot means and flexible means for connecting said brackets to an aircraft strut, and said flexible means including cables and a shock cord.

2. In an aircraft ski, a laminated runner, frame members attached to said runner adapted to engage and retain an aircraft wheel, resilient straps adapted to overlie the top central portion of an aircraft tire, means for securing said straps to said frame members, means for attaching said straps to an aircraft strut, said attaching means including brackets secured to said straps and flexible means connecting said brackets to an aircraft strut, and means for adjusting the effective length of one of said straps.

3. The combination of claim 2 and said brackets and aircraft strut connecting means including a pair of cables and a shock cord.

4. The combination of claim 3 and a protuberance disposed on the upper surface of said runner between said frame member to assist in retaining a wheel tire mounted on the runner by being buried in the tire when the straps are pulled tightly against the tire.

5. The combination of claim 2 and a protuberance disposed on the upper surface of said runner between said frame member to assist in retaining a wheel tire mounted on the runner by being buried in the tire when the straps are pulled tightly against the tire.

6. The combination of claim 1 and a protuberance disposed on the upper surface of said runner between said frame member to assist in retaining a wheel tire mounted on the runner by being buried in the tire when the straps are pulled tightly against the tire.

REUEL T. CALL.

REFERENCES CITED

The following references are of record in the file of this patent:

UNITED STATES PATENTS

| Number | Name | Date |
|---|---|---|
| 766,940 | Drury | Aug. 9, 1904 |
| 983,324 | Thim | Feb. 7, 1911 |
| 1,066,009 | Heiney | July 1, 1913 |
| 1,127,762 | Hobbs | Feb. 9, 1915 |
| 2,237,471 | Billings | Apr. 8, 1941 |
| 2,321,561 | Bircher | June 8, 1943 |

FOREIGN PATENTS

| Number | Country | Date |
|---|---|---|
| 117,612 | Germany | Apr. 15, 1900 |